United States Patent Office.

SAMUEL C. BISHOP, OF NEW YORK, N. Y., ASSIGNOR TO BISHOP GUTTA-PERCHA COMPANY, OF SAME PLACE.

Letters Patent No. 73,287, dated January 14, 1868.

IMPROVED WATER-PROOF OR DAMP-PROOF PAPER.

*The Schedule referred to in these Letters Patent and making part of the same.*

TO ALL WHOM IT MAY CONCERN:

Be it known that I, SAMUEL C. BISHOP, of the city, county, and State of New York, have invented or discovered a new and useful Improvement in Water-Proof or Damp-Proof Paper, of which the following is a full, clear, and exact description.

This, my invention, has for its basis or object the utilization of valata or balata in the manufacture of water or damp-proof paper, applicable, amongst other purposes, as a substitute for parchment, and for making collars, cuffs, envelopes, bank-note paper, boot or shoe-soles, and packing-paper for silks, jewelry, and other purposes, where paper may be used, and which it is desirable should have a water or damp-proof character.

This gum (valata or balata) is obtained from a tree or plant which is indigenous to and common in English and French and Dutch Guiana, and other parts of South America, and may either be obtained from the stock or bark-covered portion of the tree, as fairly or fully-developed gum, and be used in connection with paper, much as rubber or gutta percha is used, or be extracted from the younger shoots as milk, and be applied with the brush to one or both surfaces of the paper, and rolled between heated rollers for use in single sheets, or in several thicknesses rolled or pressed together.

In the manufacture of my improved damp-proof paper as prepared from or with the gum, the latter may be soaked, macerated, and rolled as India rubber is sheeted, and passed between calender-rolls with the sheet of paper applied to it, either on one or both sides. It may thus be made either in single or two or more thicknesses, the adhesive property of the gum serving to effect the union of the sheets.

This valata or balata, however, will be found much more tractable and easy to work than India rubber, that, till vulcanized, is comparatively useless, and too readily affected by heat or changes of temperature; while, as contrasted with gutta percha, it can be used or worked and applied in the arts at a very much higher temperature, and is much less brittle and friable.

What I here claim, and desire to secure by Letters Patent, is—

A damp-proof paper, prepared with valata or balata gum or milk, in any way, substantially as herein specified.

SAM. C. BISHOP.

Witnesses:
P. NOLAN,
GEORGE H. STARR.